UNITED STATES PATENT OFFICE.

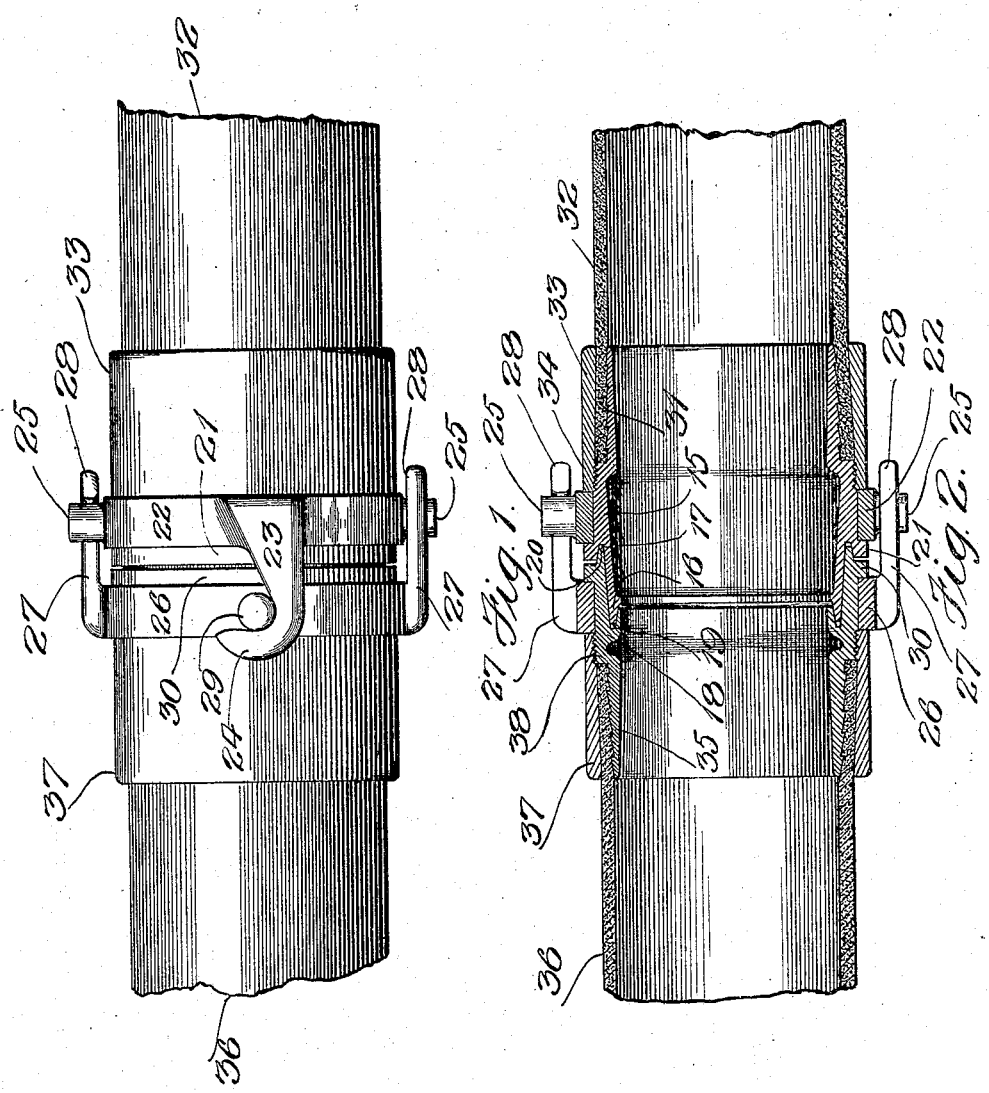

NILS M. ROSENDAHL, OF CHICAGO, ILLINOIS.

HOSE-COUPLING.

936,566.  Specification of Letters Patent.  Patented Oct. 12, 1909.

Application filed May 21, 1908. Serial No. 434,104.

*To all whom it may concern:*

Be it known that I, NILS M. ROSENDAHL, a citizen of the United States, residing at Chicago, in the county of Cook and State of Illinois, have invented certain new and useful Improvements in Hose - Couplings, of which the following is a specification.

The object of my invention is to provide a new and improved device for quickly uniting or disconnecting the ends of consecutive lengths of hose.

More particularly my object is to provide devices to be attached to the meeting ends of the lengths of hose, which shall be adapted to quickly and securely unite them and which shall also have means for attachment to the hose.

These objects and other objects of detail in connection therewith will be made apparent in the following specification and claims, taken in connection with the accompanying drawings in which—

Figure 1 is an elevation of the device of my invention, and Fig. 2 is a longitudinal section thereof.

The member 15 has the general shape of a hollow cylinder terminating on one end in an annular projecting flange 16, a section of which has a wedge shape. Back of this projecting end 16 the outer surface of the member 15 is gently tapered and ends in an annular groove 17. The opposed co-acting member 18 has a groove 19 adapted to receive the projecting flange 16 and a flange 20 adapted to enter the groove 17. The meeting edges of the two members 15 and 18 are bounded by the respective circumferential ribs 21 and 30. Back of the rib 21 is a solid ring 22 from opposite sides of which extend the projections 23 terminating in hooks 24. Intermediately placed on the ring 22 between the projections 23 are the studs 25.

Back of the circumferential ridge 30 on the member 18 is a ring 26 with projections 27, hooks 28 and studs 29 corresponding to the ring 22 and its parts which have just been described. As will be seen from the drawings, the hooks 24 and 28 are adapted to engage the studs 29 and 25, respectively.

The extremity of the member 15 which is opposite the junction thereof with the member 18 has an externally tapered surface 31 with circumferential corrugations thereon. When the parts are assembled the end of the hose 32 is slipped over this taper 31. Outside of the hose is a sleeve 33 having screw-threaded engagement with the member 15, as indicated by the reference numeral 34. This sleeve has an internal taper that is parallel to the external taper of the part 31 and it is therefore obvious that as the parts referred to are screwed together the space between them is slightly diminished, thus clamping the hose 32. The end 35 of the member 18 is also externally tapered and circumferentially corrugated to engage the hose 36 between it and the external sleeve 37, which engages the member 18 by means of the screw-threads 38.

In assembling the parts the ring or sleeve 33 is first slipped over the end of the hose 32, then the end 31 of the member 15 is slipped within the end of the hose 32, the ring 22 being in position thereon. Then the sleeve 33 is screwed up, thus clamping the end of the hose 32 tightly between the members 31 and 33, the corrugations on the member 31 insuring a firm hold. The sleeve 33 in combination with the flange 21 confines the ring 22 forming guides therefor. The parts on the left of the figures are assembled similarly to those just described. The figures show the two members in engagement with one another. When it is desired to disengage them one of the rings 22 or 26 is rotated in a direction so that the respective hooks 24 or 28 will release the corresponding studs 29 or 25. The inverse operation of coupling the hose links together will be obvious without further description.

It will be observed that I have invented a hose coupling which is adapted to be secured to the end of the hose by simple effective means. The end of the hose being completely inclosed both inside and outside is protected from abrasion or any other damage. Circumferential ridges 16 and 20 co-acting with the grooves 19 and 17, together with the co-acting tapered surfaces between them afford a very secure fit between the two coupling members. The interlocking rings with their hooks and studs permit connecting or disconnecting the members in the shortest possible time.

No washers or gaskets need be employed in my improved coupling device.

I claim:

In a pipe coupling, two members to be locked together, one member having a convex tapering surface with an annular rib at its extremity and an annular groove at its base, the other member having a co-acting concave flaring surface with an annular rib at its extremity and an annular groove at its base, the rib on each member being adapted to fit tightly within the groove on the other member, rotatable rings on the respective members, studs and hooks on one ring, and respectively co-acting hooks and studs on the other ring.

In testimony whereof, I have subscribed my name.

NILS M. ROSENDAHL.

Witnesses:
 EDYTHE M. ANDERSON,
 ANNIE C. COURTENAY.